US012036816B2

(12) United States Patent
Proctor

(10) Patent No.: US 12,036,816 B2
(45) Date of Patent: Jul. 16, 2024

(54) REMOVABLY ATTACHABLE HANDLE APPARATUS FOR MANIPULATING CANVAS ART

(71) Applicant: Hands Off Handles, Inc., Cedar City, UT (US)

(72) Inventor: Kathy C. Proctor, LaVerkin, UT (US)

(73) Assignee: Hands Off Handles, Inc., Cedar City, UT (US)

( * ) Notice: Subject to any disclaimer, the term of this patent is extended or adjusted under 35 U.S.C. 154(b) by 233 days.

(21) Appl. No.: 17/547,870

(22) Filed: Dec. 10, 2021

(65) Prior Publication Data

US 2022/0185004 A1 Jun. 16, 2022

Related U.S. Application Data

(60) Provisional application No. 63/124,582, filed on Dec. 11, 2020.

(51) Int. Cl.
*B44D 3/18* (2006.01)

(52) U.S. Cl.
CPC .................................... *B44D 3/18* (2013.01)

(58) Field of Classification Search
CPC ............ B44D 3/18; B44D 3/185; B44D 7/00
See application file for complete search history.

(56) References Cited

U.S. PATENT DOCUMENTS

| | | | | |
|---|---|---|---|---|
| 1,432,336 A | 10/1922 | Hurley | | |
| 4,493,504 A * | 1/1985 | MacHose | B44D 3/00 | 294/146 |
| 5,257,843 A * | 11/1993 | Nunn | B65G 7/12 | 294/902 |
| 5,326,147 A * | 7/1994 | Watson | B44D 7/00 | 294/162 |
| 5,397,158 A * | 3/1995 | Brass | B65G 7/12 | 294/26 |
| 5,425,562 A * | 6/1995 | Baldwin | B65G 7/12 | 294/16 |
| 6,412,838 B1 * | 7/2002 | Malamud | B65G 7/12 | 294/15 |
| 7,284,500 B2 | 10/2007 | Denny et al. | | |
| 2010/0019114 A1 | 1/2010 | Vargo | | |
| 2014/0083056 A1 * | 3/2014 | Grove | B44D 3/185 | 53/472 |

OTHER PUBLICATIONS

Acrylic Paint Pouring Handles' (Hands Off Handles), Jul. 4, 2021 (Jul. 4, 2021), [online], retrieved from <URL: https://www.amazon.com/Hands-Off-Handles-Acrylic-Pouring/dp/B09G6HF2Z3>, entire document.

* cited by examiner

*Primary Examiner* — Stephen A Vu
(74) *Attorney, Agent, or Firm* — Gurr Brande & Spendlove, PLLC; Robert A. Gurr

(57) ABSTRACT

A removably attachable handle apparatus includes brackets coupleable to canvas art with handles coupleable to the brackets. Brackets may be positioned on opposite sides of the canvas art. An artist may then grasp the handles to create art (e.g., acrylic pours) or may otherwise transport wet art without fear of smudging the art.

2 Claims, 11 Drawing Sheets

REMOVABLY ATTACHABLE HANDLE APPARATUS FOR MANIPULATING CANVAS ART

CROSS-REFERENCE TO RELATED APPLICATIONS

This application claims the benefit of U.S. Provisional Application Ser. No. 63/124,582, filed on Dec. 11, 2020, which is incorporated herein by reference.

TECHNICAL FIELD

The present disclosure relates to carrying handles and canvas art. More particularly, the present disclosure relates to removably attachable handles that couple to canvas panels so that the canvas panel may be manipulated or transported without affecting the art thereon.

BACKGROUND

Canvas has been a medium for artists to express their thoughts, creativity, and feelings for thousands of years. Painting on canvas can often be a messy process due to the many paints used, the style of art, and transporting a wet painting. Because the painting process is messy, artists must be cautious not to touch or smudge the canvas unintentionally. The opportunity for making a mess or ruining a painting may vary plated upon the type of painting style being performed. For example, typical painting approaches with numerous brushes and an easel provide for a more controlled environment where messes can be prevented. However, painting with brushes and an easel may still require towels to clean up potential spills and issues may still arise when transporting a wet or semi-wet painting.

Other painting techniques have the potential to produce massive messes. One of these painting techniques is acrylic pouring, which is a fluid technique that allows an artist to pour paint on a canvas and manipulate the canvas to distribute acrylic paint to create a painting. To manipulate the canvas, artists grab the edges and tilt at different angles to distribute the paint. Due to the amount of excess acrylic paint on the canvas, the artist's hands may become covered with the paint runoff Many artists use gloves to prevent the paint from getting on their hands and many artists use paper towels or cloth towels to wipe the gloves to prevent transferring paint to the canvas or other surfaces. Even with the use of gloves and towels, many messes or mishaps cannot be avoided. These messes may be manifested in the artist's workspace or may be manifested when paint from the artist's hands is transferred unintentionally to the canvas. When this occurs, frustrations may arise, preventing the artist from freely creating.

Additionally, it is difficult to manipulate a canvas panel when the artist's hands are directly attached to the panel. For example, a thumb or finger may prevent the paint from running as it should, particularly when doing acrylic pouring, which may ruin the art. Therefore, many issues arise when an artist contacts the canvas panel to move, manipulate, or transport it.

Accordingly, there is a need for an apparatus that allows an artist to manipulate, distribute, and transport a painting without creating a mess or ruining a painting. The present disclosure seeks to solve these and other problems.

SUMMARY OF EXAMPLE EMBODIMENTS

In some embodiments, a removably attachable handle apparatus comprises brackets, a shaft positionable between the brackets, and handles coupleable to the brackets. The brackets comprise an upper plate and a lower plate. The upper plate comprises a first handle aperture and a second handle aperture to receive the handles therein. The upper plate further comprises upper plate apertures to receive pins to secure the bracket to a canvas panel. The lower plate comprises a shaft protrusion to receive the shaft. The shaft protrusion may comprise a shaft channel (e.g., a u-shaped channel) that includes a first lip and a second lip to secure the shaft inserted therein. Similar to the upper plate, the lower plate comprises lower plate apertures to receive pins to secure the bracket to the canvas panel.

In some embodiments, a removably attachable handle apparatus comprises brackets which may be positioned on opposite sides of a canvas panel. The brackets couple to a frame of the canvas panel. The brackets comprise an upper plate, a lower plate, and a side wall interposed between and perpendicular to the upper plate and the lower plate. Between the upper plate and lower plate is a receiving channel to receive the frame of the canvas panel.

DETAILED DESCRIPTION OF EXAMPLE EMBODIMENTS

Figure 1:
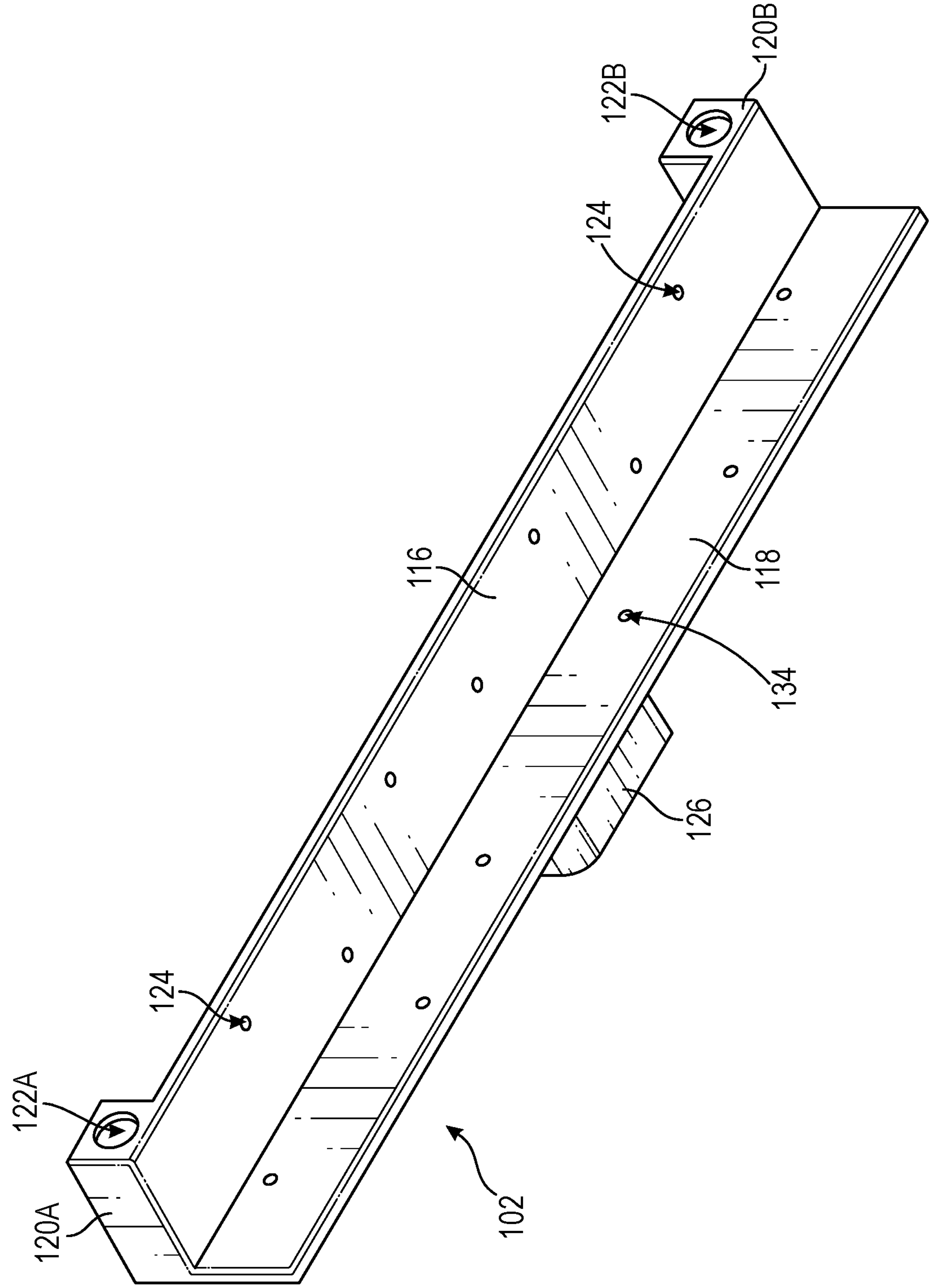
FIG. 1 illustrates a bottom, front perspective view of a bracket of a removably attachable handle apparatus.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," do not necessarily refer to the same embodiment, although they may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various sequences and arrangements while still falling within the scope of the present invention.

The term "coupled" may mean that two or more elements are in direct physical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including, but not limited to," the term "having" should be interpreted as "having at least," the term "includes" should be interpreted as "includes, but is not limited to," etc.).

As discussed earlier, there is a need for an apparatus that allows an artist to manipulate, distribute, and transport a painting without creating a mess or ruining a painting. The present disclosure seeks to solve these and other problems.

Acrylic painting requires an artist to pour acrylic paint on a canvas panel and manipulate the panel to distribute the paint. To manipulate the canvas panel, an artist grasps the edges of the panel and moves it at different angles to distribute the paint. During this process, paint may run directly onto the artist's hands or gloves, which will have to be wiped off with a towel. If the paint is not continually cleaned off of the artist's hands, the artist may run the risk of leaving unintended marks or smudges on the canvas panel. Consequently, acrylic painting is a messy process requiring latex gloves and cleaning supplies, such as towels. The removably attachable handle apparatus described herein seeks to prevent the messy process as described above and to avoid errors in the art creation process.

Generally, the removably attachable handle apparatus disclosed herein comprises brackets and handles. To use the removably attachable handle apparatus, an artist couples the brackets to opposites sides of a canvas panel/frame. Once the brackets are coupled to the canvas panel, handles may then be inserted into each bracket, giving a location for the artist to grab and manipulate the canvas panel without physically contacting the panel. It will be appreciated that by using the removably attachable handle apparatus, the artist's hands stay clean of the paint and thus is less likely to transfer the paint to unintended locations. Additionally, the artist uses fewer cleaning supplies to clean their hands and painting area. Furthermore, the handles allow the canvas panel to be more easily manipulated to enhance distribution of the paint rather than having to grasp the canvas panel directly. This helps to ensure that the artist's hands do not interfere with the art as well.

Referring now to FIGS. 1-4, in some embodiments, a removably attachable handle apparatus 100 comprises at least one bracket 102A-B coupleable to a canvas panel 104, a shaft 106 positionable between the brackets 102A-B, and handles 108A-B separately coupleable to each bracket 102A-B. The brackets 102A-B may be positioned on opposite sides of the canvas panel 104. For example, on a rear side 109 of the canvas panel 104, the brackets 102A-B may be coupled to the canvas panel 104 at a first end 110 and a second end 112. Specifically, the brackets 102 couple to a frame 114 of the canvas panel 104.

Each bracket 102A-B comprises an upper plate 116 and a lower plate 118. In one embodiment, the upper plate 116 and lower plate 118 form a 90-degree angle to receive the frame 114. The upper plate 116 comprises a first protrusion 120A with a first handle aperture 122A and a second protrusion 120B with a second handle aperture 122B to receive and secure a handle 108A-B therein. While two handle apertures 122A-B are shown, it will be appreciated that one or more apertures may be implemented to receive the handles 108A. For example, it may be envisioned that a single aperture may be used to receive a handle. Additionally, other approaches of securing handles may include snaps, tongue and groove, spring-loaded pins, elastic bands, hook and loop, etc. Furthermore, in some embodiments, the handles 108A may be formed with the bracket 102A so as to create a single unit, which may be attached to a canvas panel.

The upper plate 116 further comprises upper plate apertures 124 to receive pins 125 (shown in FIG. 3) to secure the brackets 102A-B to the frame 114 of the canvas panel 104. For example, the pins 125 may be inserted through the upper plate apertures 124 and into the frame 114 of the canvas panel 104, thereby securing the bracket 102. While pins 125 are shown, it will be appreciated that tacks, screws, nails, or other securement mechanisms may be used with the upper plate apertures 124.

Figure 2:
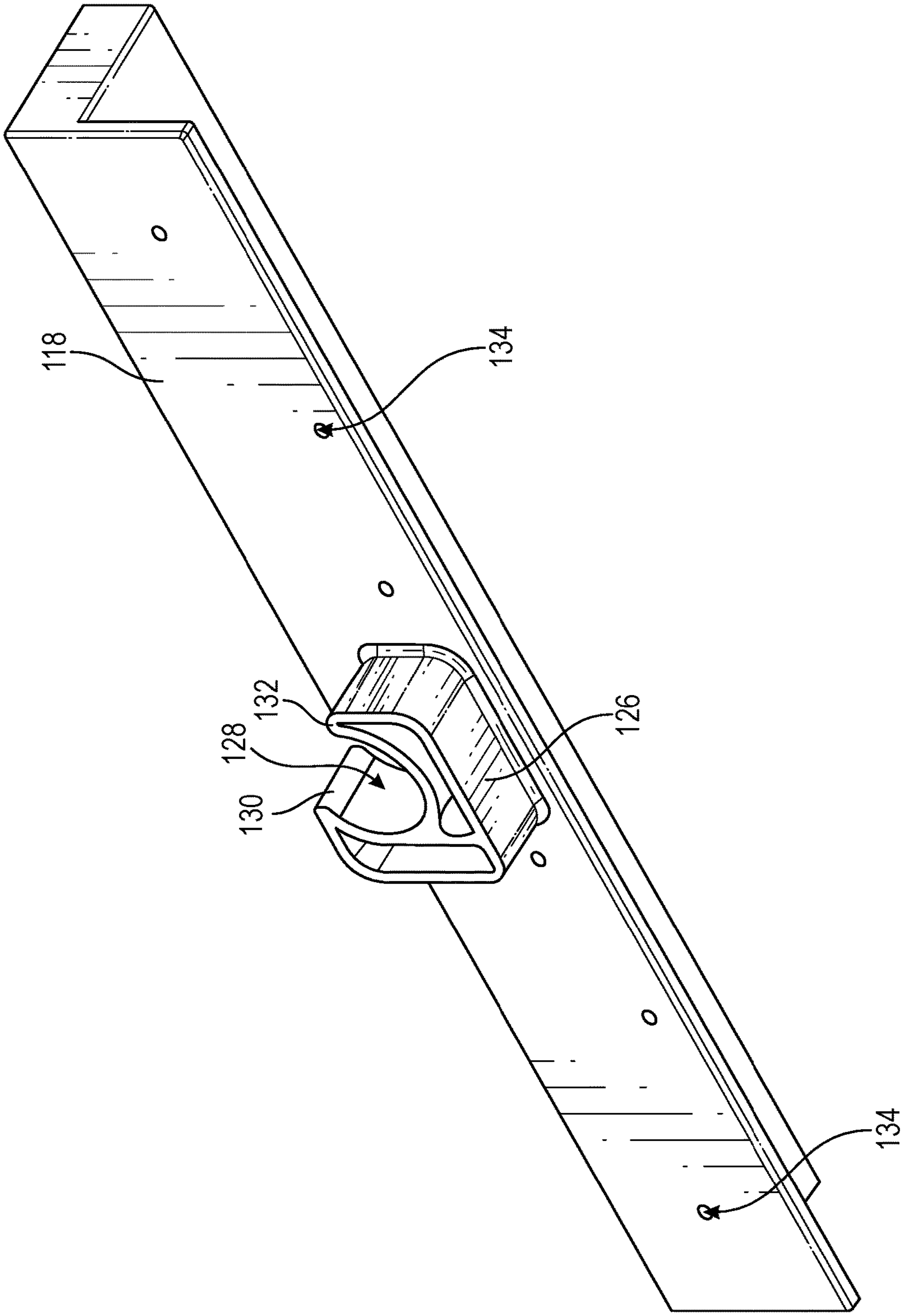
FIG. 2 illustrates a bottom, rear perspective view of a bracket of a removably attachable handle apparatus.
Figure 3:
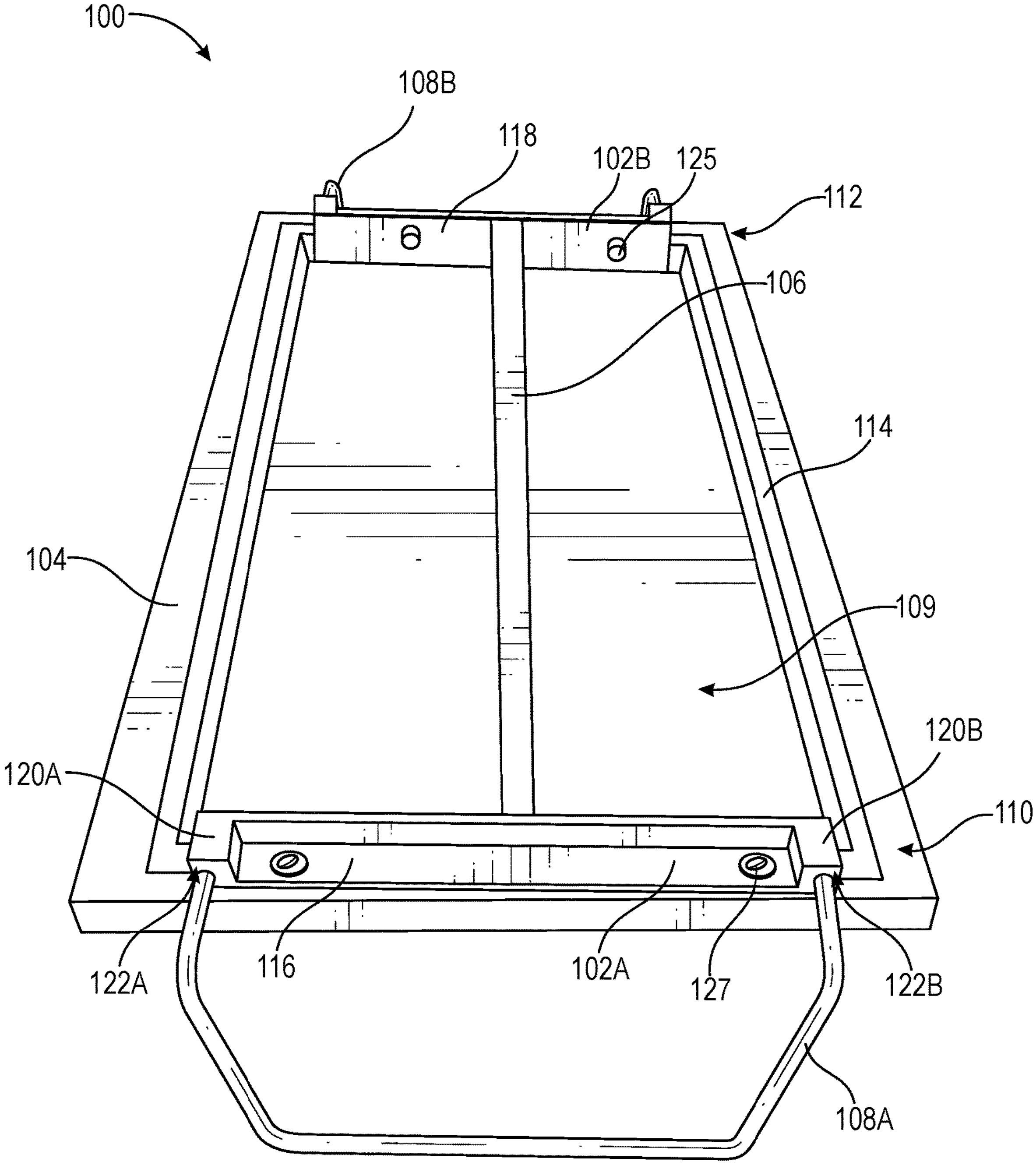
FIG. 3 illustrates a bottom, rear perspective view of a removably attachable handle apparatus coupled to a canvas panel.

As best seen in FIG. 2, the lower plate 118 comprises a shaft protrusion 126 to receive the shaft 106 (FIG. 3). The shaft protrusion 126 may comprise a shaft channel 128 (e.g., a c-shaped channel) with a first lip 130 and a second lip 132 to secure the shaft 106 inserted therein. The shaft 106 may stabilize the frame 114 and give structure to the removably attachable handle apparatus 100. In one embodiment, the shaft 100 may be a wooden dowel. Further, the shaft 106 may be PVC, metal, etc. In some embodiments, the shaft 106 may comprise a first and a second section hingedly coupled. Alternatively, the shaft 106 may be a bar latch, gate latch, ring latch, spring-bar, or any other bar interposable between the two brackets 102A-B on the canvas panel 104. It will be appreciated that the shaft 106 may be of a variety of lengths so that the removably attachable handle apparatus 100 may couple to all sizes of canvas panels. Similar to the upper plate 116, the lower plate 118 comprises lower plate apertures 134 to receive pins 127 to secure the bracket 102A-B to the canvas panel 104.

While pins 125, 127 are described as securing the brackets 102A-B, it will be appreciated that, in some embodiments, the brackets 102A-B may be secured to the canvas panel 104 via the shaft 106 only. For example, the shaft 106 and the brackets 102A-B may be attached to one another so that they are installed simultaneously on the canvas 104. In one example, a user would place a first bracket 102A on a first side 110, would extend the shaft 106 (e.g., spring bar, telescoping, or other method) so as to engage a second bracket 102B with a second side 112. The brackets 102A-B may then be held in position via tension. Alternatively, in some embodiments, the brackets 102A-B may be secured to the canvas panel 104 without the need of the shaft 106.

Figure 4:
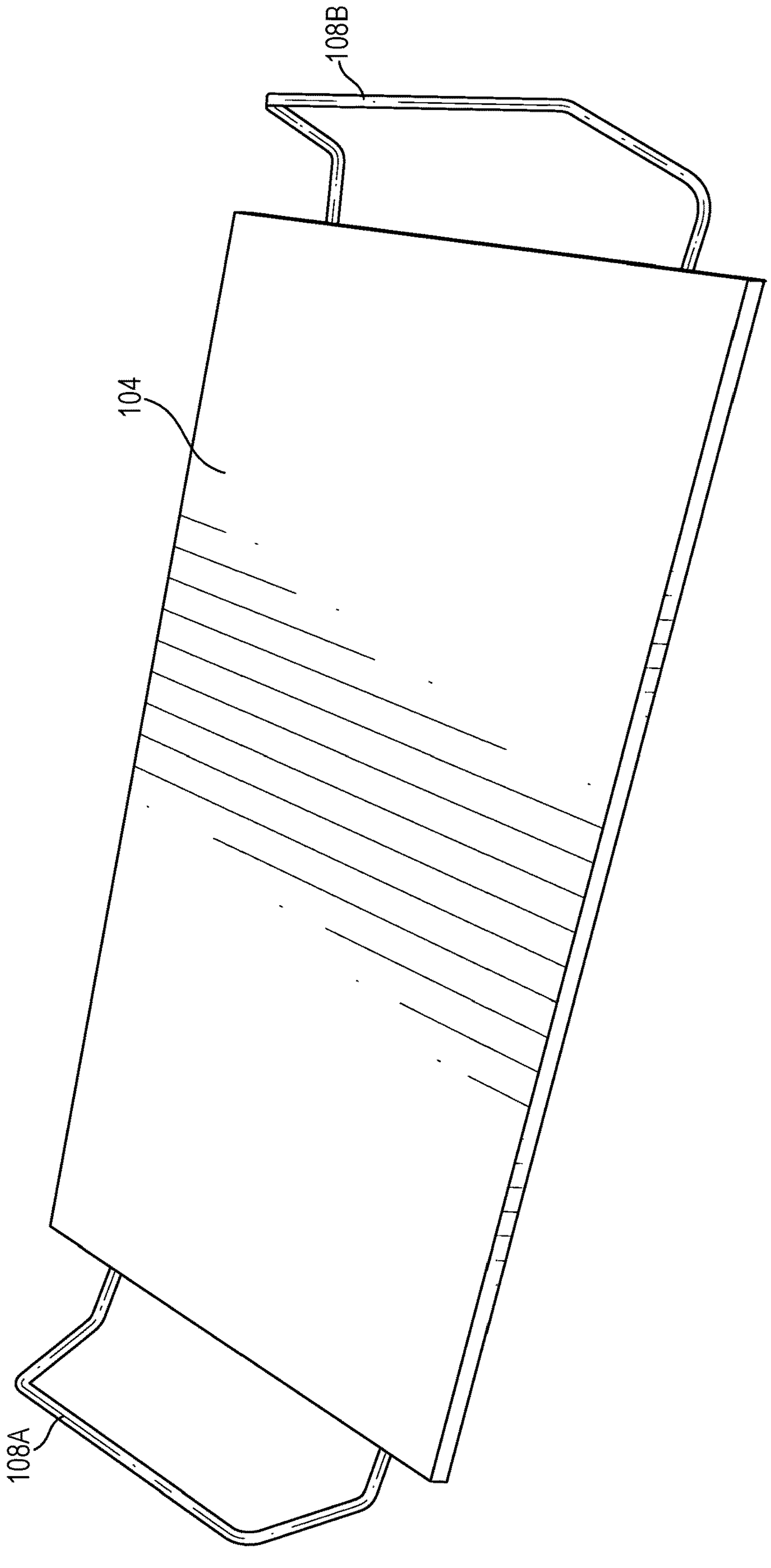
FIG. 4 illustrates a top perspective view of a removably attachable handle apparatus coupled to a canvas panel.
Figure 5:
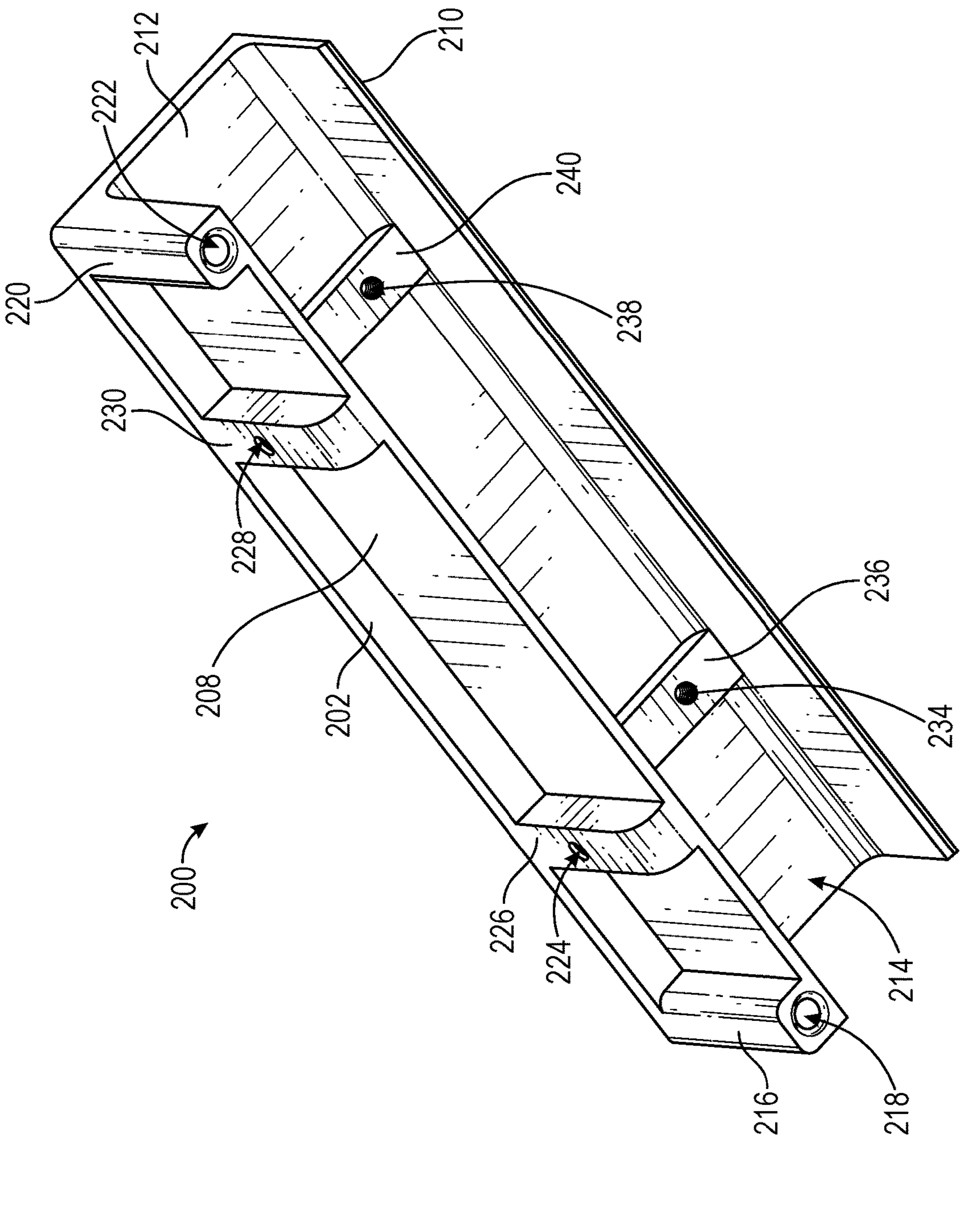
FIG. 5 illustrates a front, top perspective view of a removably attachable handle apparatus.
Figure 6:
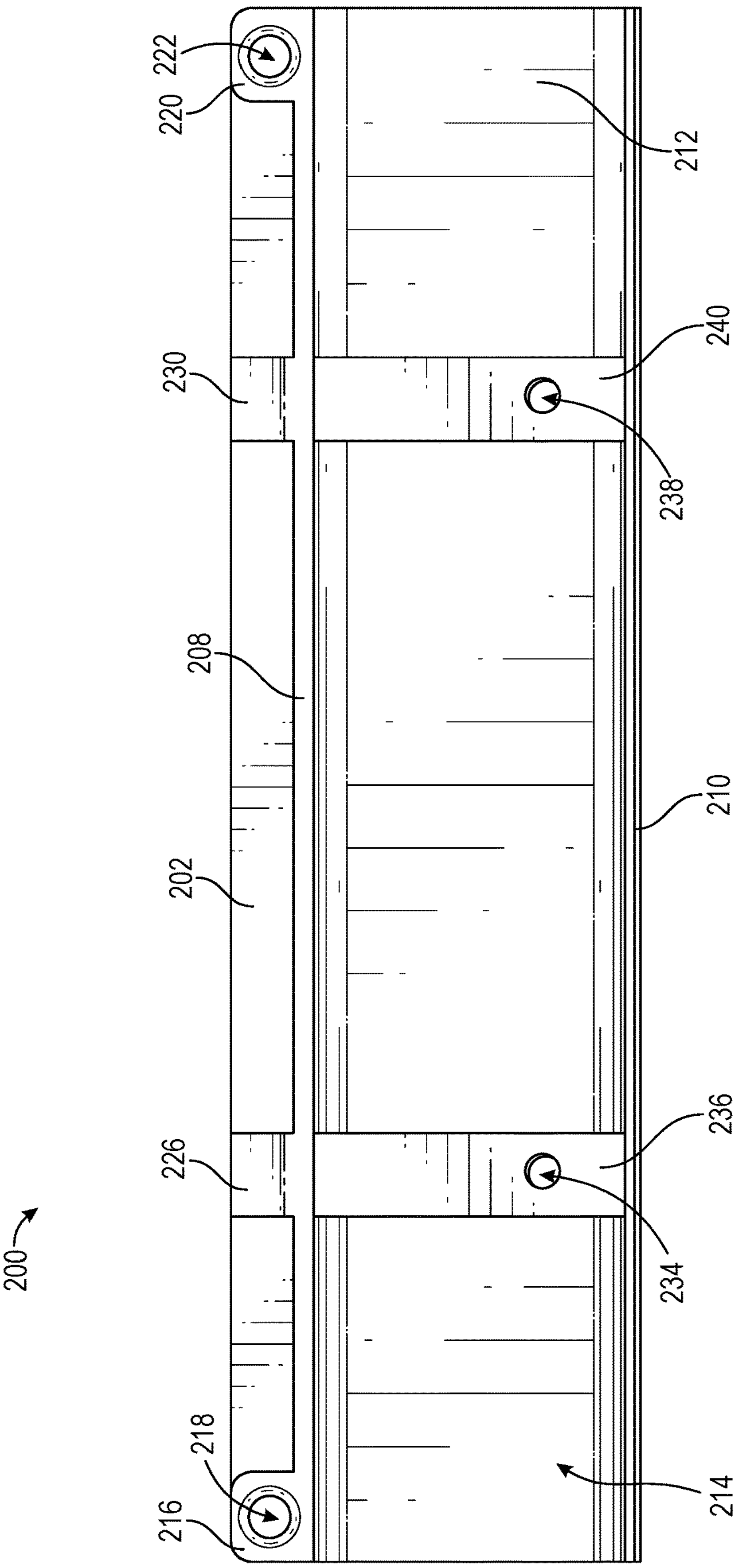
FIG. 6 illustrates a front elevation view of a removably attachable handle apparatus.
Figure 7:
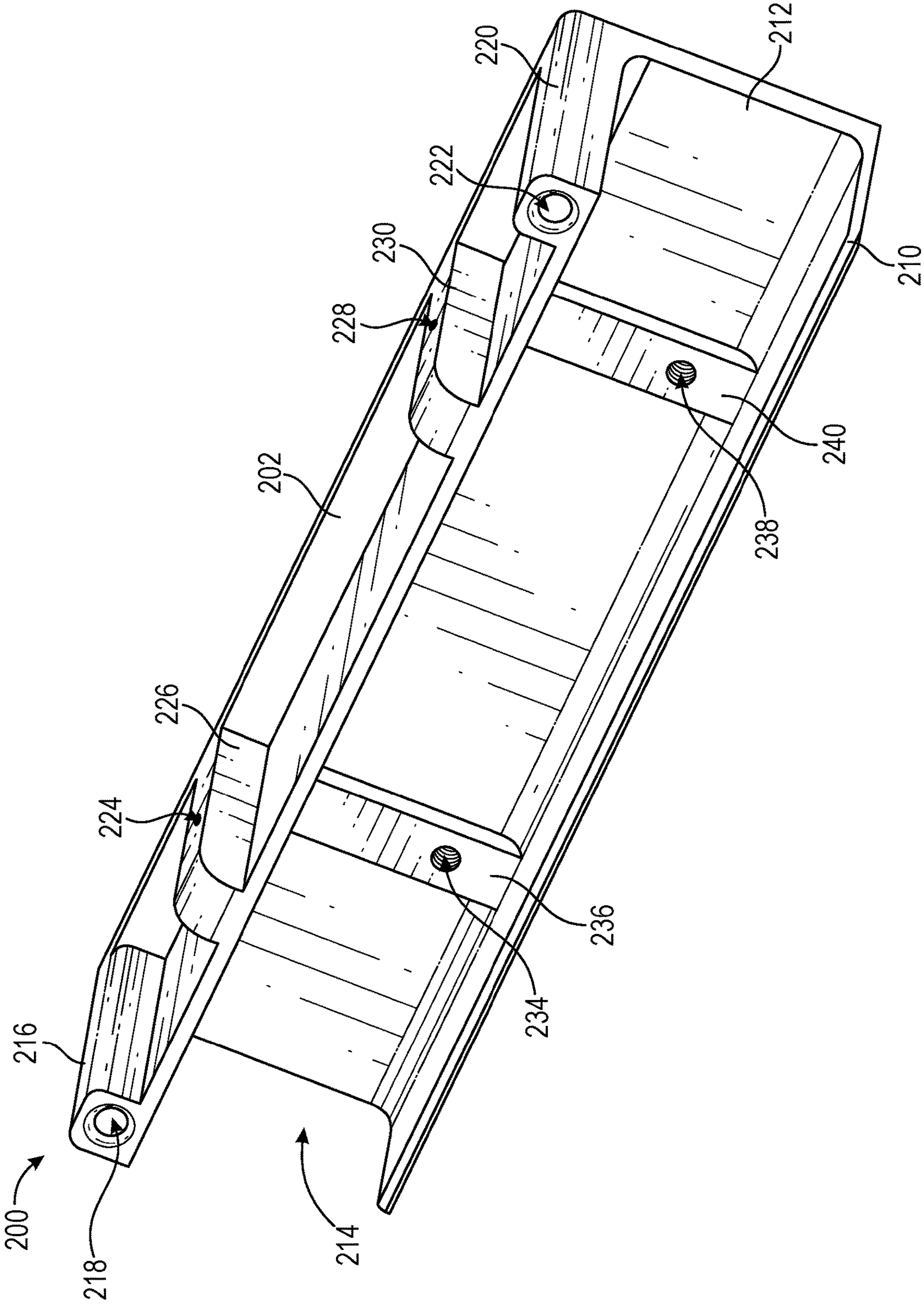
FIG. 7 illustrates a front perspective view of a removably attachable handle apparatus.
Figure 8:
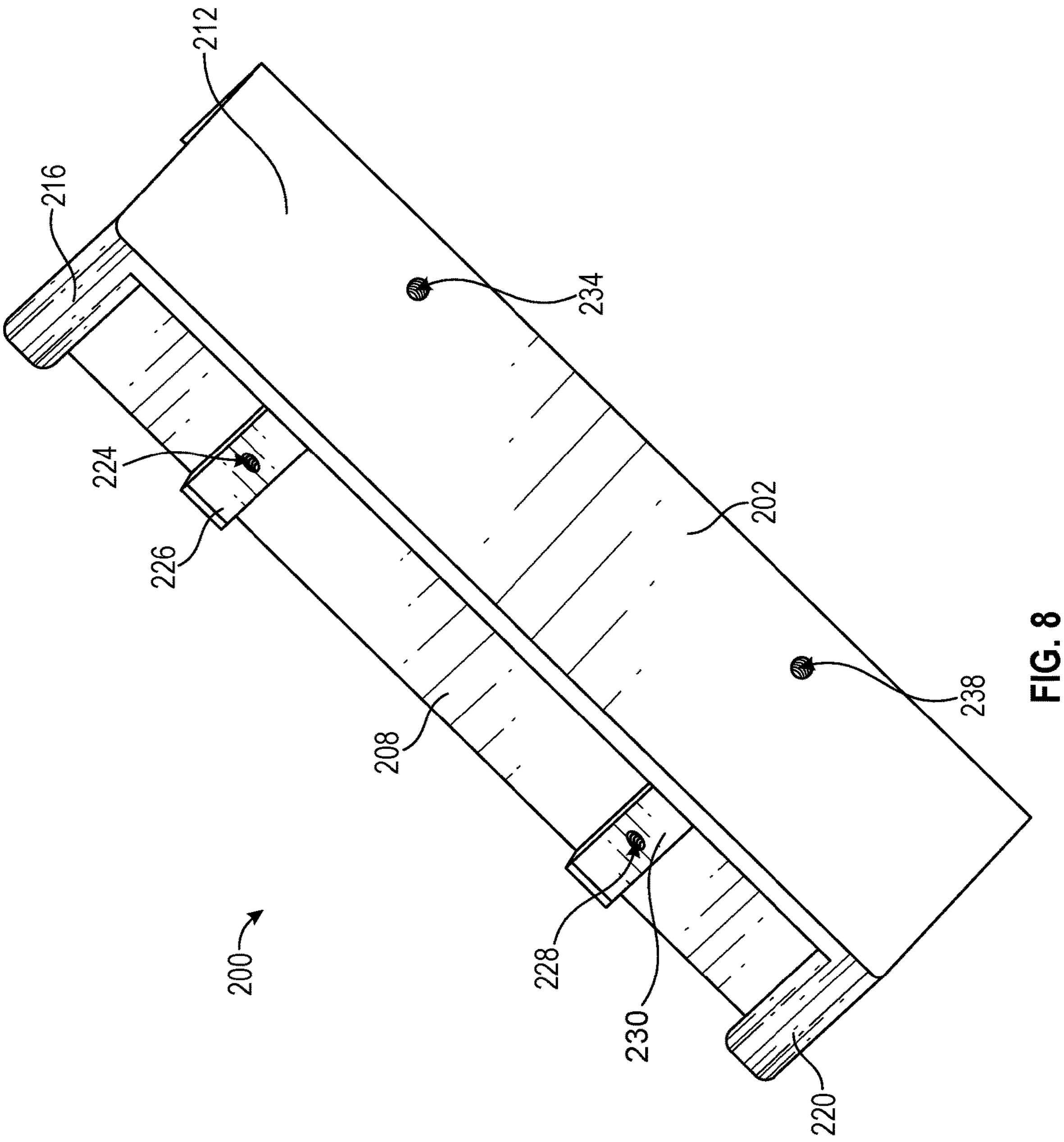
FIG. 8 illustrates a rear, top perspective view of a removably attachable handle apparatus.
Figure 10:
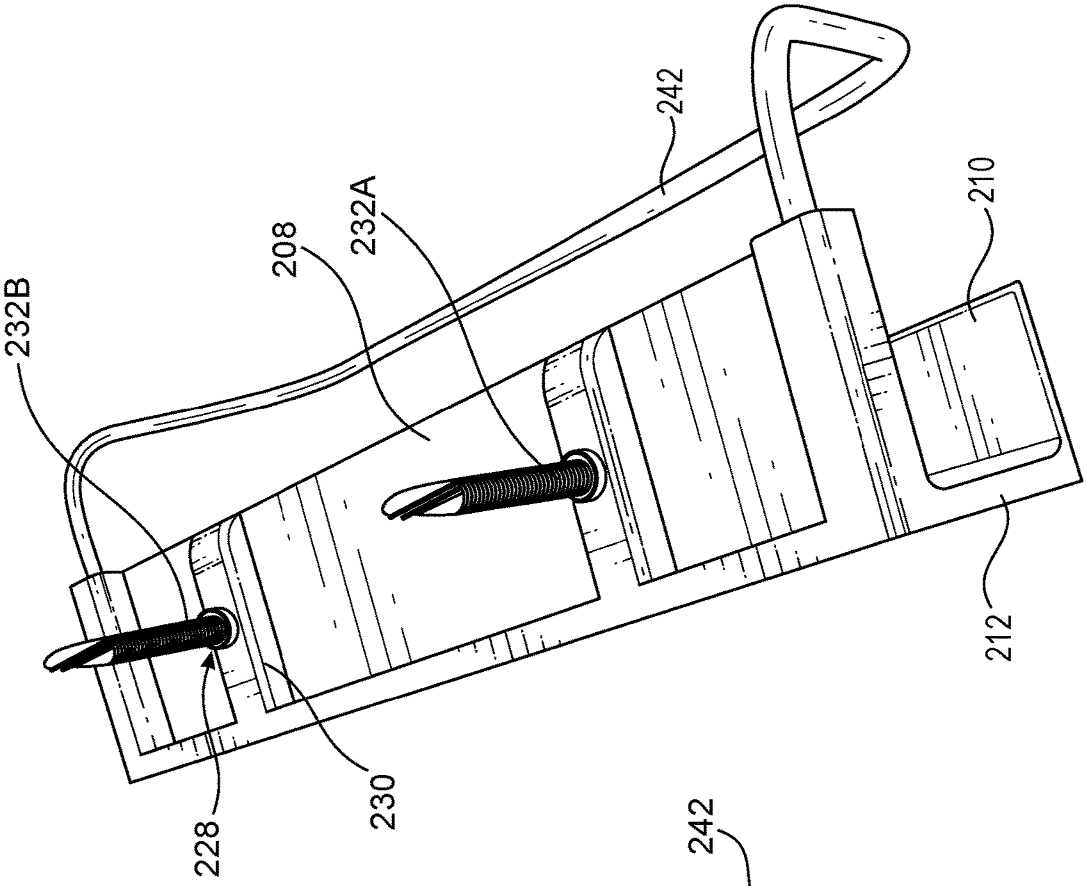
FIG. 10 illustrates a side, top perspective view of a removably attachable handle.
Figure 9:
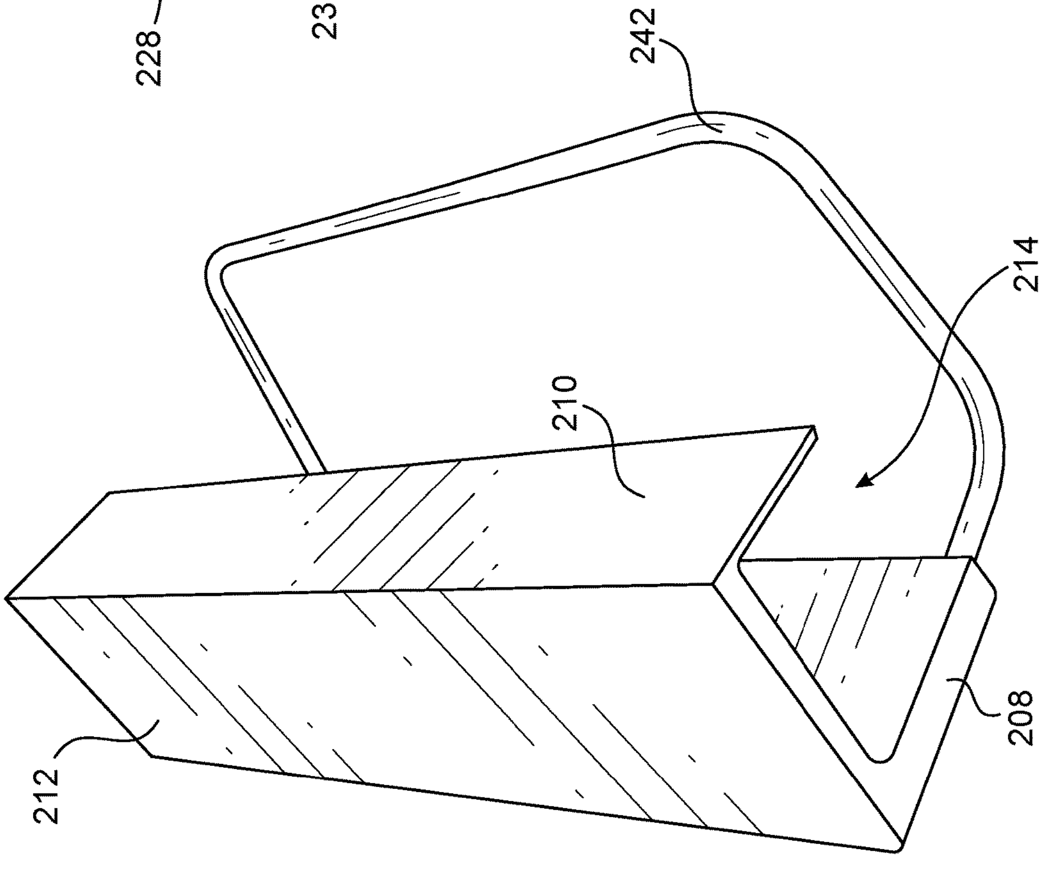
FIG. 9 illustrates a side, bottom perspective view of a removably attachable handle apparatus.
Figure 11:
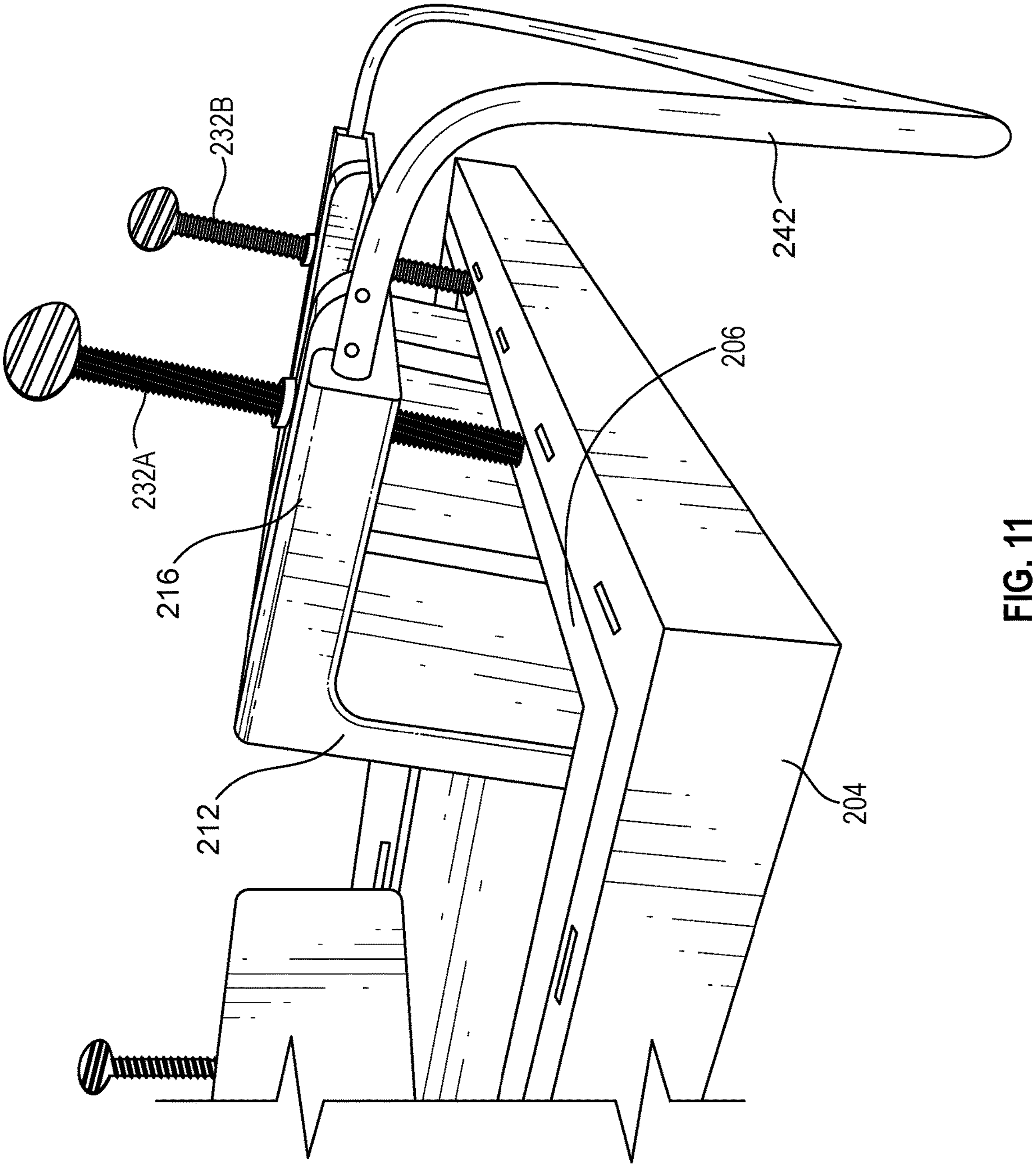
FIG. 11 illustrates a side perspective view of a removably attachable handle coupled to a canvas panel.

Referring to FIGS. 3-4, once the brackets 102A-B are coupled to the frame 114 of the canvas panel 104 via, for example, the pins 125, 127 and shaft 106, the handles 108A-B may then be inserted into the first and second handle apertures 122A, 122B. The handles 108A-B may be a variety of shapes and sizes. Further, the handles 108A-B may be plastic, metal, wood etc. It will be appreciated that the handles 108A-B allow an artist to manipulate the canvas panel 104 in any direction without coming into contact with the paint on the canvas, thereby decreasing costs associated with latex gloves and cleaning supplies, and ensuring optimal creation of art with fear of fingerprints or smudges.

Referring to FIGS. 5-12, in one embodiment, a removably attachable handle apparatus 200 comprises at least one bracket 202 which may be positioned on an end or side of a canvas panel 204. In some embodiments, a plurality of brackets 202 may be coupled to a canvas panel 204 (FIGS. 11-12) for additional handholds. In particular, the brackets 202 couple to a frame 206 of the canvas panel 204. The brackets 202 comprise an upper plate 208, a lower plate 210, and a side wall 212 coupling the upper plate 208 to the lower plate 210, forming a "U" shape. Between the upper plate 208 and lower plate 210 is a receiving channel 214 to receive the frame 206 of the canvas panel 204.

The upper plate 208 comprises a first raised edge 216 with a first handle aperture 218 and a second raised edge 220 with a second handle aperture 222 to receive and secure handles 224 therein (FIGS. 9-12). While raised edges 216, 220 are described, they are not required, and the upper plate may be thick enough to comprise apertures directly therein without having a raised edge. Additionally, while two handle apertures 218, 222 are shown, it will be appreciated that one or more apertures may be implemented to receive the handles 224. For example, it may be envisioned that a single aperture may be used to receive a handle (e.g., a single rod). Additionally, other approaches of securing handles may include snaps, tongue and groove, spring-loaded pins, elastic bands, hook and loop, etc. The upper plate 208 further comprises a first upper aperture 224 positioned on a first protrusion 226 and a second upper aperture 228 positioned on a second protrusion 230 to receive screws 232A-B (FIG. 11), or any other securement mechanism, to secure the brackets 202 to the frame 206 of the canvas panel 204. In some embodiments, the first and second upper apertures 224, 228 may be threaded. For example, screws 232A-B may be inserted through the upper apertures 224, 228 and into the frame 206 of the canvas panel 204, thereby securing the bracket 202 to the frame 206. However, other securement mechanisms may also be used, such as push pins, nails, or similar.

Further, the lower plate 210 may be the same width and length as the upper plate 208. However, in some embodiments, the lower plate 210 may have a width and length that is less than or greater than the upper plate 208. It will be appreciated that the lower plate 210 is positionable between the frame 206 and the canvas. Similar to the upper plate 208, the side wall 212 comprises a first side wall aperture 234 on a first sidewall protrusion 236 and a second side wall aperture 238 on a second sidewall protrusion 240 to receive screws, nails, or any other securement mechanism, to secure the brackets 202 to the frame 206 of the canvas panel 204. However, it should be noted that these securement mechanisms are optional, as the screws 232A-B are sufficient to clamp and secure the removably attachable handle apparatus 200 to the canvas panel 204.

To use the removably attachable handle apparatus 200, a user slides the lower plate 210 between the frame 206 and the canvas of the canvas panel 204, the frame 206 being received in the receiving channel 214. The upper plate 208 is therefore positioned on an opposite side of the frame 206 from the lower plate 210. Screws 232A-B may then be placed through the first and second upper apertures 224, 230, respectively, to contact the frame 206. As the screws 232A-B are threaded, a clamping force on the frame 206 is exerted between the screws 232A-B and the lower plate 210, securing the brackets 202 to the frame 206. When the brackets 202 are secured, the handles 242 are inserted into the first and second handle apertures 218, 222 on each bracket 202, allowing the artist to pour paint on the canvas panel and manipulate the canvas at any angle to distribute the paint. The handles 242 may be secured by interference fit, locking pin, locking screw, cam lock, or other mechanism. In some embodiments, the handles are integrated with the bracket 202, rather than being removable.

Figure 12:
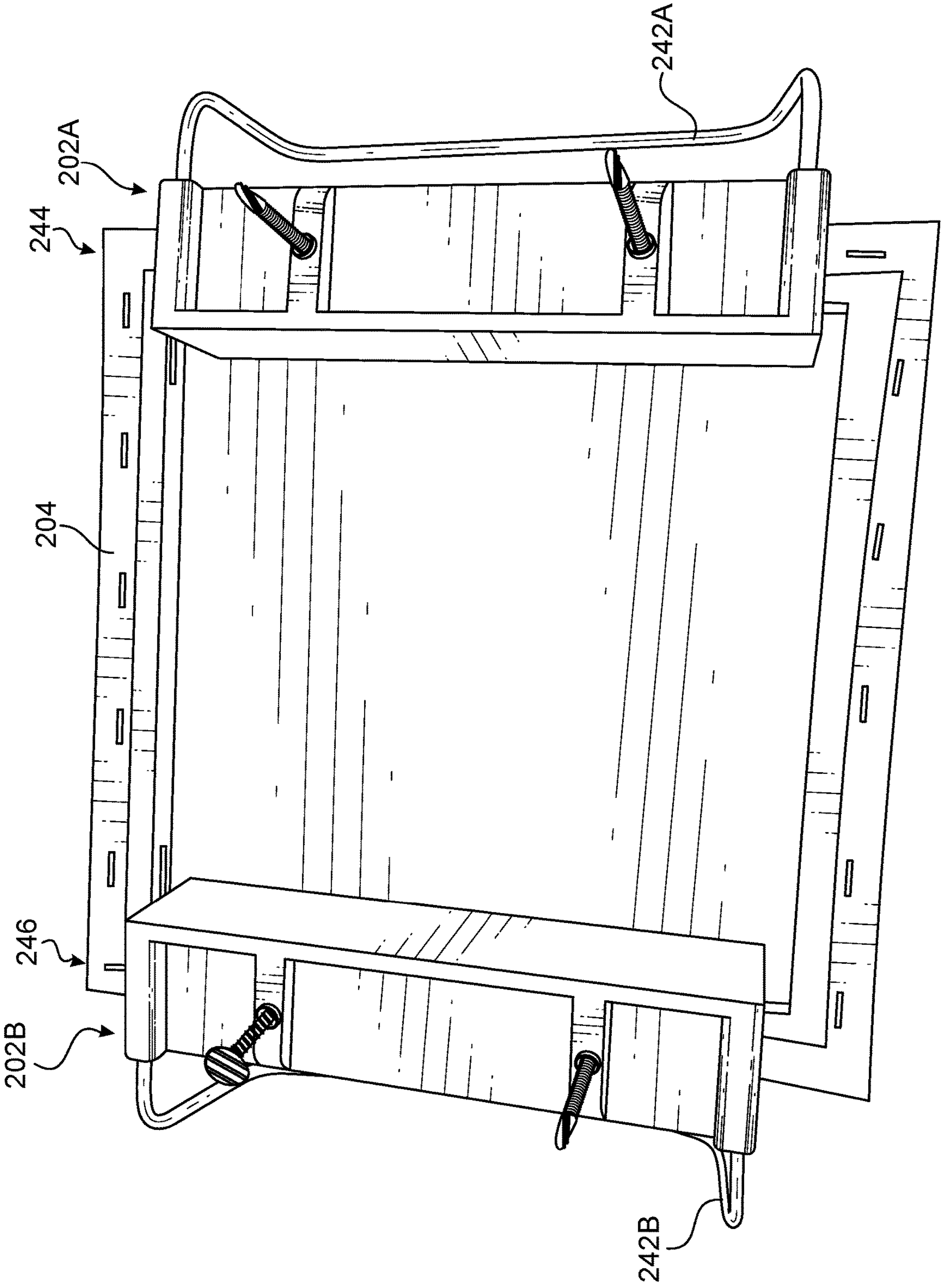
FIG. 12 illustrates a back perspective view of a canvas panel with removably attachable handles coupled thereto.

Accordingly, as shown in FIG. 12, a first bracket 202A may be coupled to a first end 244 of a canvas panel 204 and a second bracket 202B may be coupled to a second end 246 of the canvas panel 204. A user may then grip the first handle 242A and the second handle 242B to turn, carry, or otherwise maneuver the canvas panel 204 without touching the canvas. As a result, a user's hands remain cleaner and the canvas is not interfered with, nor is paint transferred by hands to the canvas, overcoming the issues in the prior art.

It will also be appreciated that systems and methods according to certain embodiments of the present disclosure may include, incorporate, or otherwise comprise properties or features (e.g., components, members, elements, parts, and/or portions) described in other embodiments. Accordingly, the various features of certain embodiments can be compatible with, combined with, included in, and/or incorporated into other embodiments of the present disclosure. Thus, disclosure of certain features relative to a specific embodiment of the present disclosure should not be construed as limiting application or inclusion of said features to the specific embodiment unless so stated. Rather, it will be appreciated that other embodiments can also include said features, members, elements, parts, and/or portions without necessarily departing from the scope of the present disclosure.

Moreover, unless a feature is described as requiring another feature in combination therewith, any feature herein may be combined with any other feature of a same or different embodiment disclosed herein. Furthermore, various well-known aspects of illustrative systems, methods, apparatus, and the like are not described herein in particular detail in order to avoid obscuring aspects of the example embodiments. Such aspects are, however, also contemplated herein.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention.

What is claimed is:

1. A removably attachable handle apparatus for a canvas panel, comprising:

an upper plate, comprising:
- a first handle aperture,
- a second handle aperture,
- a first upper aperture, and
- a second upper aperture;

a lower plate sized so as to be insertable between canvas and a frame of the canvas panel;

a side wall coupling the upper plate to the lower plate;

a receiving channel configured to receive the frame of the canvas panel;

a handle having a first end for mating with the first handle aperture and a second end for mating with the second handle aperture; and a first screw passing through the first upper aperture and a second screw passing through the second upper aperture.

2. The removably attachable handle apparatus of claim 1, wherein the side wall comprises a first aperture and a second aperture.

* * * * *